United States Patent
Brumme et al.

(10) Patent No.: US 7,685,574 B2
(45) Date of Patent: Mar. 23, 2010

(54) CONSTRAINED EXECUTION REGIONS

(75) Inventors: Christopher W Brumme, Mercer Island, WA (US); Sean E Trowbridge, Sammamish, WA (US); Rudi Martin, Redmond, WA (US); WeiWen Liu, Redmond, WA (US); Brian M. Grunkemeyer, Redmond, WA (US); Mahesh Prakriya, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1110 days.

(21) Appl. No.: 10/953,650

(22) Filed: Sep. 29, 2004

(65) Prior Publication Data

US 2006/0070041 A1    Mar. 30, 2006

(51) Int. Cl.
G06F 9/44     (2006.01)
G06F 9/45     (2006.01)
G06F 11/00    (2006.01)

(52) U.S. Cl. .................. 717/130; 717/124; 717/148; 717/158; 714/37

(58) Field of Classification Search .............. 717/124, 717/131, 130
See application file for complete search history.

(56) References Cited

U.S. PATENT DOCUMENTS

| | | | | | |
|---|---|---|---|---|---|
| 5,193,180 | A | * | 3/1993 | Hastings | 717/163 |
| 5,361,351 | A | * | 11/1994 | Lenkov et al. | 717/124 |
| 5,613,063 | A | * | 3/1997 | Eustace et al. | 714/38 |
| 5,628,017 | A | * | 5/1997 | Kimmerly et al. | 717/127 |
| 5,675,803 | A | * | 10/1997 | Preisler et al. | 717/131 |
| 5,907,709 | A | * | 5/1999 | Cantey et al. | 717/141 |
| 5,909,580 | A | * | 6/1999 | Crelier et al. | 717/141 |
| 5,953,530 | A | * | 9/1999 | Rishi et al. | 717/127 |
| 6,101,524 | A | * | 8/2000 | Choi et al. | 718/102 |
| 6,163,858 | A | * | 12/2000 | Bodamer | 714/34 |
| 6,282,701 | B1 | * | 8/2001 | Wygodny et al. | 717/125 |
| 6,282,702 | B1 | * | 8/2001 | Ungar | 717/148 |
| 6,381,738 | B1 | * | 4/2002 | Choi et al. | 717/140 |
| 6,769,116 | B1 | * | 7/2004 | Sexton | 717/130 |
| 6,775,536 | B1 | * | 8/2004 | Geiger et al. | 455/411 |
| 6,854,108 | B1 | * | 2/2005 | Choi | 717/125 |
| 7,062,755 | B2 | * | 6/2006 | Partamian et al. | 717/124 |
| 7,069,317 | B1 | * | 6/2006 | Colrain et al. | 709/224 |
| 7,370,321 | B2 | * | 5/2008 | Radigan | 717/144 |
| 7,418,718 | B2 | * | 8/2008 | Liu et al. | 719/328 |
| 7,421,682 | B2 | * | 9/2008 | Viehland et al. | 717/130 |
| 7,441,234 | B2 | * | 10/2008 | Cwalina et al. | 717/128 |
| 7,487,380 | B2 | * | 2/2009 | Brumme et al. | 714/3 |
| 7,496,615 | B2 | * | 2/2009 | Broussard | 707/206 |
| 7,571,428 | B2 | * | 8/2009 | Martin et al. | 717/126 |
| 7,610,322 | B2 | * | 10/2009 | Grunkemeyer et al. | 707/206 |
| 7,610,579 | B2 | * | 10/2009 | Trowbridge et al. | 717/141 |

(Continued)

OTHER PUBLICATIONS

Grossman et al. "Region-Based Memory Management in Cyclone", ACM 2002, retrieved from <http://www.cs.umd.edu/projects/cyclone/papers/cyclone-regions.pdf>, pp. 1-12.*

*Primary Examiner*—Tuan Q Dam
*Assistant Examiner*—Marina Lee (57) ABSTRACT

Authored code may include a notification that no tolerance for failure or corruption is expected for an identified sub-set of the code. Any potential failure point, which may be induced by a runtime environment routine or sub-routine, that is associated with the identified sub-set of code may then be identified and hoisted to a point apart from the identified sub-set of code.

29 Claims, 4 Drawing Sheets

U.S. PATENT DOCUMENTS

| | | | |
|---|---|---|---|
| 2003/0074605 A1* | 4/2003 | Morimoto et al. | 714/38 |
| 2003/0093685 A1* | 5/2003 | Tobin | 713/200 |
| 2004/0237064 A1* | 11/2004 | Liu et al. | 717/101 |
| 2005/0028147 A1* | 2/2005 | Bonilla | 717/138 |
| 2005/0102656 A1* | 5/2005 | Viehland et al. | 717/130 |
| 2005/0172133 A1* | 8/2005 | Brumme et al. | 713/182 |
| 2005/0172286 A1* | 8/2005 | Brumme et al. | 718/1 |
| 2005/0198621 A1* | 9/2005 | Tillmann et al. | 717/128 |
| 2005/0204341 A1* | 9/2005 | Broussard | 717/124 |
| 2005/0204342 A1* | 9/2005 | Broussard | 717/124 |
| 2005/0273764 A1* | 12/2005 | Martin et al. | 717/124 |
| 2006/0004805 A1* | 1/2006 | Grunkemeyer et al. | 707/101 |
| 2006/0070041 A1* | 3/2006 | Brumme et al. | 717/131 |
| 2006/0101401 A1* | 5/2006 | Brumme et al. | 717/124 |
| 2006/0156152 A1* | 7/2006 | Trowbridge et al. | 714/746 |

* cited by examiner

CONSTRAINED EXECUTION REGIONS

RELATED APPLICATION

This application is related to co-pending application U.S. application Ser. No. 10/845,679 (Martin, et al.); filed in the U.S. Patent and Trademark Office on May 14, 2004; entitled "Reliability Contracts"; and incorporated herein by reference in its entirety.

FIELD

The following description is directed towards providing deterministic execution of at least a designated sub-set of code.

BACKGROUND

Code developers are charged with a daunting task of authoring code that is state-consistent in the face of unanticipated or unexpected conditions. State-consistent code refers to code that is deterministic, i.e., keeps track of an executed process. Unanticipated or unexpected conditions refer to asynchronous executions such as thread abort conditions, out-of-memory conditions, and stack overflow conditions. These conditions are asynchronous in the sense that they are not typically expected in the normal execution of the authored code, and the conditions are typically injected by the runtime environment in which the code is executed.

More particularly, the runtime environment provides routines for application programs to perform properly in an operating system because application programs require another software system in order to execute. Thus, an application program calls one or more of the runtime environment routines, which reside between the application program and the operating system, and the runtime environment routines call the appropriate operating system routines.

Examples of runtime environments include: Visual Basic runtime environment; Java® Virtual Machine runtime environment that is used to run, e.g., Java® routines; or Common Language Runtime (CLR) to compile, e.g., Microsoft .NET™ applications into machine language before executing a calling routine.

SUMMARY

The paragraph that follows represents a summary to provide a basic understanding to the reader. The summary is not an exhaustive or limiting overview of the disclosure. Further, the summary is not provided to identify key and/or critical elements of the invention, delineate the scope of the invention, or limit the scope of the invention in any way. The purpose of the summary is to introduce one or more of the concepts described below in a simplified form.

Constrained execution regions are described herein. More particularly, for deterministic execution of authored code, a notification may be made that no tolerance for runtime environment induced-failure or corruption is expected for an identified sub-set of the code. Any potential failure point, which may be runtime environment routine or sub-routine, that is associated with the identified sub-set of code may then be identified and hoisted to a point external of the identified sub-set of code.

BRIEF DESCRIPTION OF THE DRAWINGS

The detailed description refers to the following drawings.

DETAILED DESCRIPTION

The following description is directed to implementations for providing deterministic execution of a designated sub-set of code.

Deterministic execution of authored code executed is jeopardized by any reliance upon a runtime environment routine or sub-routine. Code authors, then, are seeking high levels of guarantees that their authored code will be executed in a runtime environment without being corrupted by entering an undefined or non-deterministic state due to a runtime induced resource failure.

Figure 1:
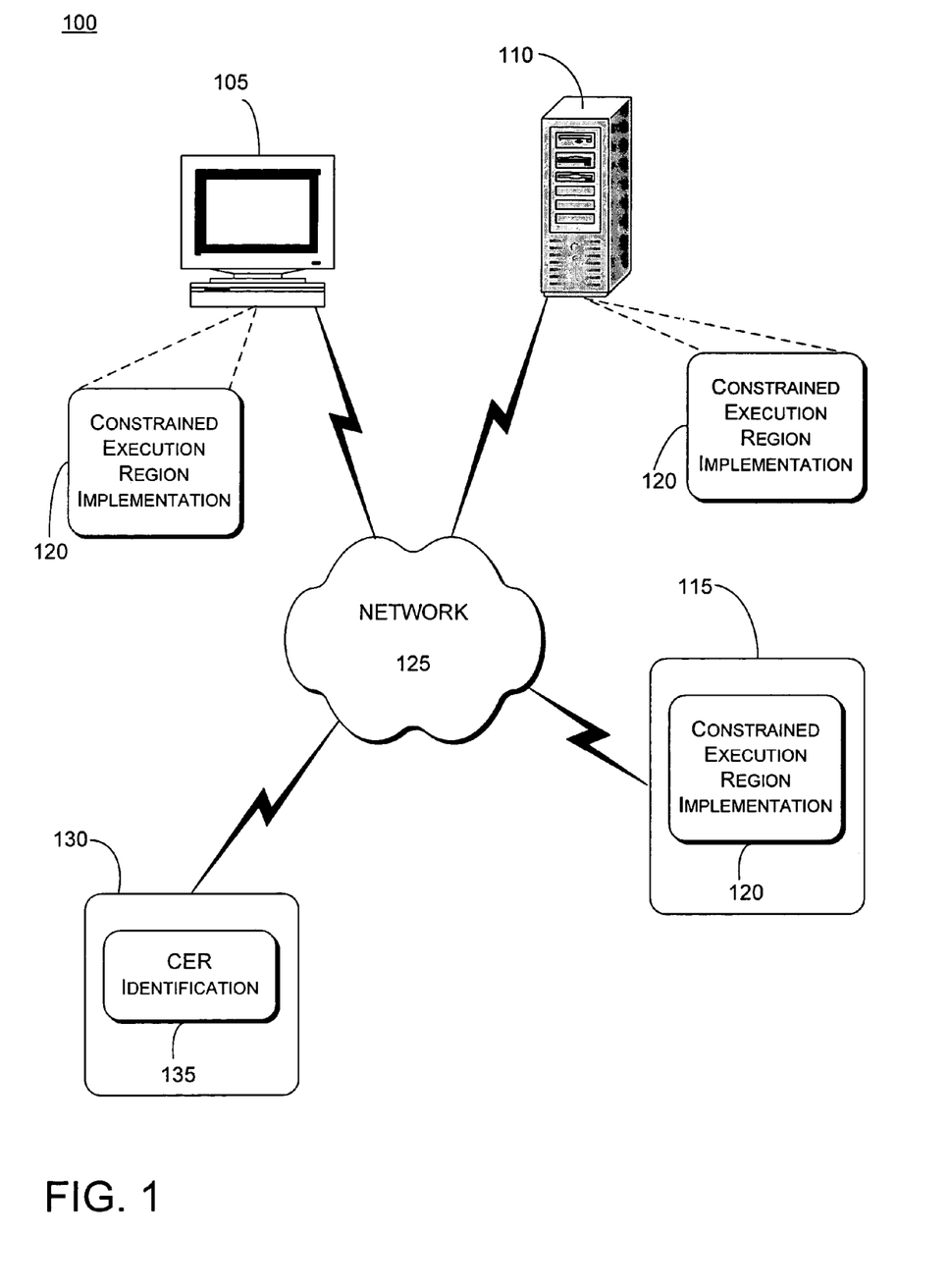
FIG. 1 shows a network environment in which example embodiments of constrained execution regions may be implemented.

FIG. 1 shows an example network environment in which implementations related to a critical execution region (CER) may be applied. More particularly, any one of client device 105, server device 110, and "other" device 115 may be capable of providing deterministic execution of code by CER implementation 120, as described herein. Client device 105, server device 110, and "other" device 115 may be communicatively coupled to one another through network 125.

Client device 105 may be at least one of a variety of conventional computing devices, including a desktop personal computer (PC), workstation, mainframe computer, Internet appliance, set-top box, and gaming console. Further, client device 105 may be at least one of any device that is capable of being associated with network 125 by a wired and/or wireless link, including a personal digital assistant (PDA), laptop computer, cellular telephone, etc. Further still, client device 105 may represent the client devices described above in various quantities and/or combinations thereof. "Other" device 115 may also be embodied by any of the above examples of client device 105. An example embodiment of client device 105 is described in more detail below with reference to FIG. 4.

Server device 110 may provide any of a variety of data and/or functionality to client device 105 or "other" device 115. The data may be publicly available or alternatively restricted, e.g., restricted to only certain users or only if an appropriate subscription or licensing fee is paid. Server device 110 is at least one of a network server, an application server, a web blade server, or any combination thereof. Typically, server device 110 is any device that is the source of content, and client device 105 is any device that receives such content either via network 125 or in an off-line manner. However, according to the example embodiments described herein, server device 105 and client device 110 may interchangeably be a sending host or a receiving host. "Other" device 115 may also be embodied by any of the above examples of server device 110. An example embodiment of server device 110 is described in more detail with reference to FIG. 4.

"Other" device 115 may further be any device that is capable of CER implementation 120 according to any of the example embodiments described herein. That is, "other" device 115 may be any software-enabled computing or processing device that is capable of leveraging a CER to provide deterministic execution of code corresponding to an application, program, function, or other assemblage of programmable and executable code, in either of a runtime environment or a testing environment. Thus, "other" device 115 may be a computing or processing device having an interpreter, converter, compiler, operating system, Java® Virtual Machine, or Common Language Runtime (CLR) implemented thereon. These examples are not intended to be limiting in any way, and therefore should not be construed in that manner.

Network 125 represents any of a variety of conventional network topologies, which may include any wired and/or wireless network. Network 125 may further utilize any of a variety of conventional network protocols, including public and/or proprietary protocols. For example, network 125 may include the Internet, an intranet, or at least portions of one or more local area networks (LANs).

Data source 130 represents any one of a variety of conventional computing devices, including a desktop personal computer (PC), that is capable of generating code for an application, program, function, or other assemblage of programmable and executable code, and that is further capable of identifying a CER in the generated code. Alternatively, data source 130 may also be any one of a workstation, mainframe computer, Internet appliance, set-top box, gaming console, personal digital assistant (PDA), laptop computer, cellular telephone, etc., that is capable of transmitting at least a portion of an application, program, or function to another work station. Further, data source 130 need not necessarily be a source of code for the application, program, or function, but rather data source 130 is at least the source of an expression of CER identification. Regardless of the embodiment, the CER identification, or expression thereof, may be transmitted from data source 130 to any of devices 105, 110, and 115 as part of an on-line notification via network 125 or as part of an off-line notification.

Figure 2A:
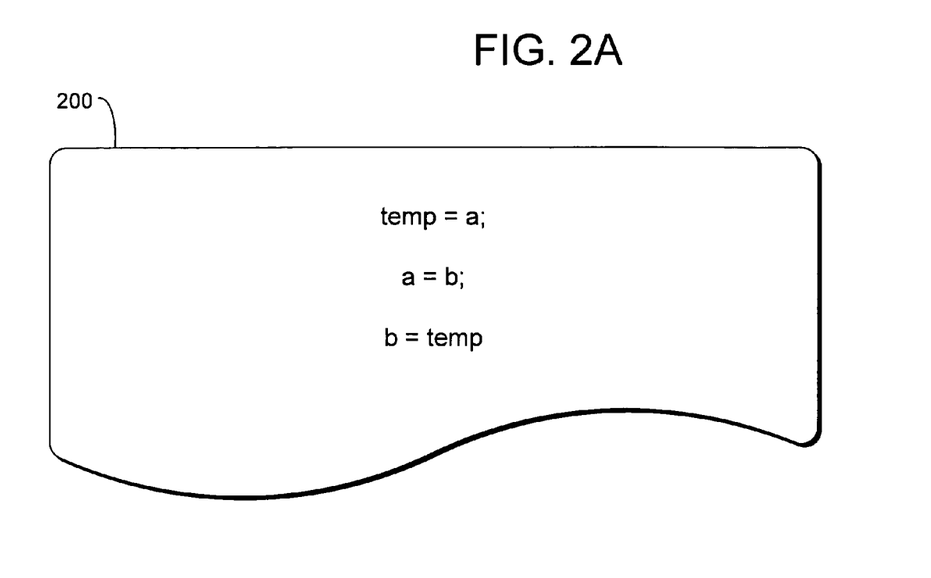
FIG. 2A shows an example program for which at least one embodiment of constrained execution region implementation may be applied.

FIG. 2A shows an example of at least a portion of code 200 corresponding to an application, program, function, or other assemblage of programmable and executable code having a CER therein. Code 200 may be transmitted to at least one of devices 105, 110, and 115 (see FIG. 1) for execution. In particular, code 200 may be submitted for execution by a runtime environment (i.e., system or infrastructure) that is intended to execute programs at one of devices 105, 110, and 115.

The runtime environment routines and sub-routines called by code 200 may, in turn, call appropriate operating system routines in order for the code 200 to be executed. Therefore, unless an author of code 200 is intimately knowledgeable of the implications of the runtime environment routines and subroutines that may be injected into portions of code 200 in order to for code 200 to be executed on the operating system, deterministic execution of code 200 may be uncertain in the runtime environment.

In the event that the author of code 200 does not possess comprehensive knowledge of runtime environment routines and subroutines as well as any effects that they may have on the execution of code 200, substantive measures may be required to provide deterministic execution of code 200, i.e., execution that is not interrupted or corrupted by unanticipated or undesired conditions including, but not limited to, a runtime environment induced resource failure. It is noted that code 200 may include an annotation of process-anticipated conditions that may interrupt or terminate processing of at least a sub-set of code 200 as a result of runtime environment injected routines or subroutines. Regardless, non-limiting examples of such unanticipated or undesired conditions resulting from runtime environment routines or subroutines that are injected into code 200 include, but are not limited to, resource failures such as a thread-abort condition, a stack overflow condition, or an out-of-memory condition.

A thread abort condition is a call to abort a thread in which code 200 is being executed. The motivations for a thread abort condition are numerous, and do not need to be articulated for understanding of the example embodiments described herein. Suffice to say that the injection of a runtime environment routine or subroutine into code 200 may produce a thread abortion condition.

An out-of-memory condition may result if the execution of a runtime environment routine or subroutine within a designated portion of code 200 requires amounts of hardware memory or virtual memory that are not compatible with other processes, and therefore such memory allocations may not be accommodated. A stack overflow condition may result if the execution of the runtime environment routine or subroutine within the designated portion of code 200 requires more hardware memory or virtual memory than is available on a stack. Alternatively, a stack overflow condition may occur as a result of a runtime environment routine or subroutine that has an infinite recursion or a level of method calls that extends beyond a predetermined threshold level.

Figure 2B:
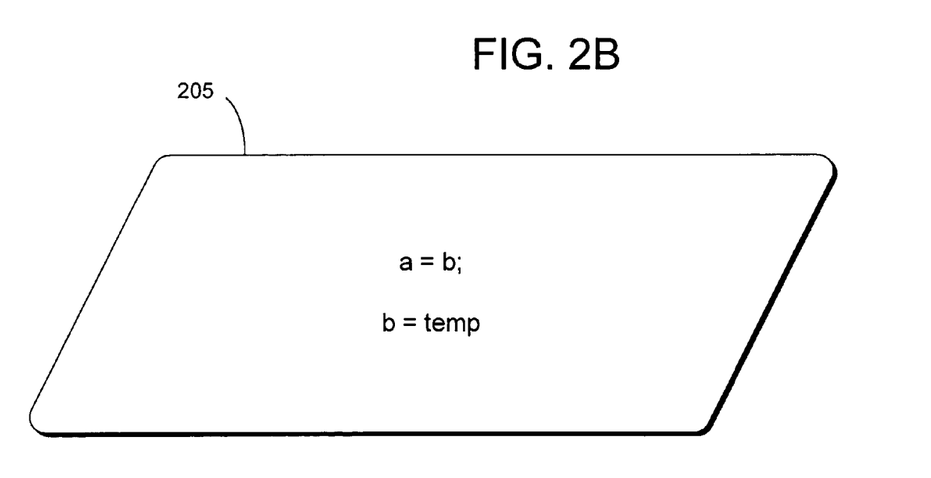
FIG. 2B shows an example embodiment of a constrained execution region identifier.

FIG. 2B shows an example of data structure 205 containing an expression of the identification of a critical execution region (CER) in code 200. Data structure 205 may be attached to code 200 or embedded in code 200. Alternatively, code 200 and data structure 205 may be separate data entities that are transmitted alone or separately on-line or via a computer-readable medium. Furthermore, in alternative embodiments, either one of code 200 and data structure 205 may include an annotation of potential process interrupting or corrupting conditions that may be anticipated as a result of runtime environment injected routines or subroutines.

In FIG. 2B, data structure 205 is shown as including the lines of code a=b;
b=temp which may be deemed to be the CER of code 200. However, alternative embodiments of data structure 205 may include different expressions of CER identification. For instance, data structure 205 may otherwise identify a CER of code 200 by indicating line numbers that bound a CER within code 200, or data structure 205 may identify CER by indicating a function corresponding to a CER.

In addition, a CER within code 200 may comprise non-contiguous portions of code 200, and therefore data structure 205 may include any combination of expressions of identification of a non-contiguous CER as described above. Further still, code 200 may include more than one CER, which may be identified as described above in one or more renditions of data structure 205.

Figure 3:
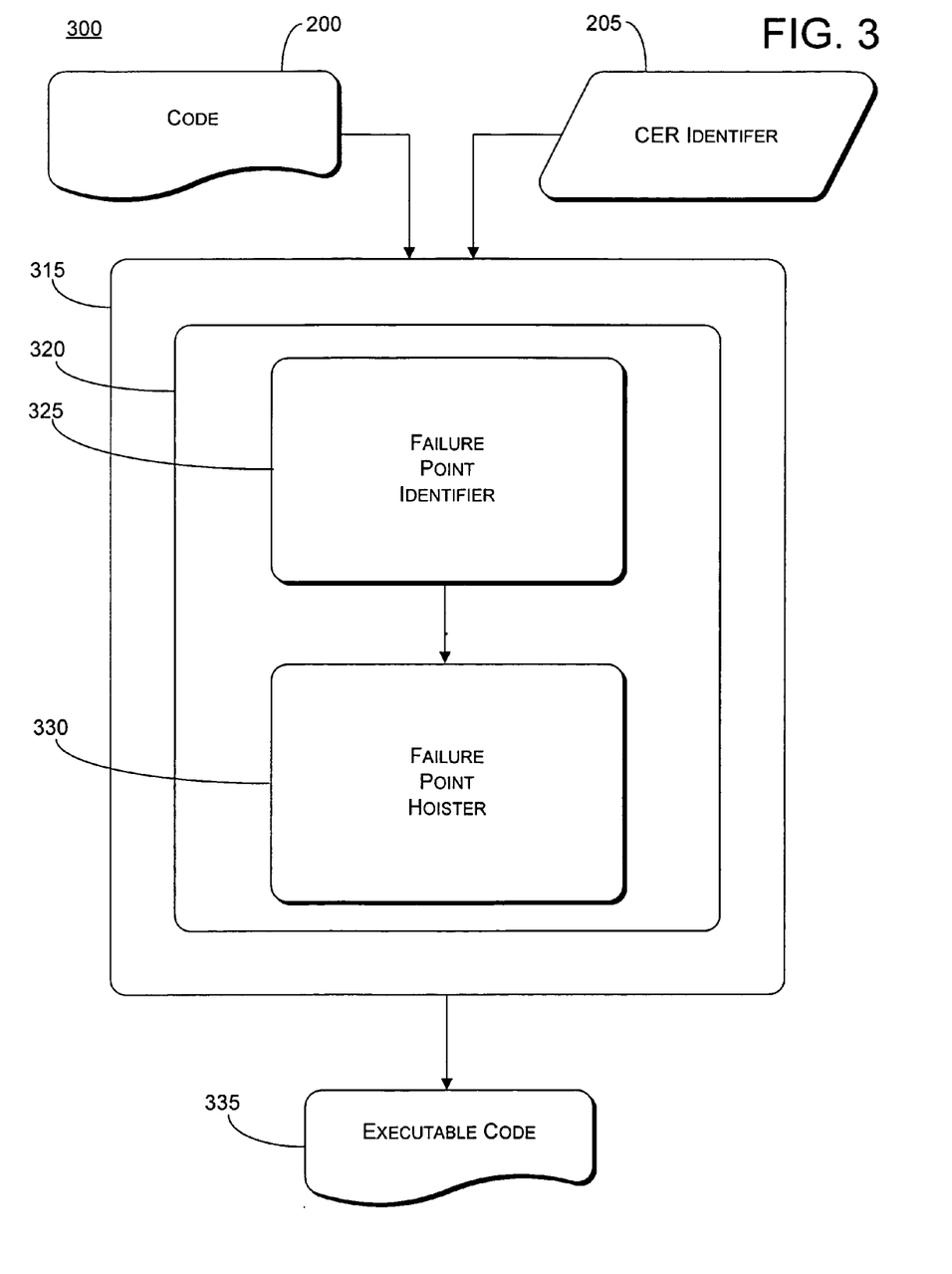
FIG. 3 shows an example processing flow for constrained execution region implementation and an example of modules associated therewith.

FIG. 3 shows an example embodiment of a processing flow for CER implementation 120 (see FIG. 1), and a description there of is provided with reference to code 200 and data structure 205 (see FIG. 2).

In FIG. 3, code 200 may be transmitted to processing device 315 from an external source including, but not limited to, the authoring source of code 200. The transmission of code 200 may be made via an on-line transmission or via a computer-readable medium such as, but not limited to, a compact disc.

Similarly, data structure 205 may also be transmitted to processing device 315 from an external source. An authoring source of code 200 may likely be the entity most knowledgeable of the capabilities and limitations of code 200, and therefore may be a source of data structure 205 containing a notification that an identified sub-set of code 200 is not expected to tolerate runtime environment induced failure, interruption, or corruption during the execution of the identified sub-set of code 200. In other words, the authoring source of code 200 may provide data structure 205 identifying a CER, i.e., critical region, in code 200 to processing device 315. In alternative embodiments, a source other than the authoring source of code 200 may provide data structure 205 to processing device 315. Further, the transmission of data structure 205 may be made via an on-line transmission or via a computer-readable medium such as, but not limited to, a compact disc.

Processing device 315 may be any one of client device 105, server device 100, or "other" device 115 described above with reference to FIG. 1. Further, runtime environment 320 may reside on processing device 315, and failure point identifier 325 may itself be a runtime environment routine. According to one example embodiment, the runtime environment may be part of a compiling program.

Failure point identifier 325 may serve to identify runtime environment routines or subroutines that, if failure thereof was to occur, may induce a resource failure leading to, at least, interruption or corruption of the CER of code 200. According to one example, upon receiving an expression of identification 205 for the CER in code 200, failure point identifier 325 may identify any routines or subroutines corresponding to runtime environment 320 that may be injected into the CER in code 200 on an operating system (OS) for processing device 325. The identified runtime environment routines or subroutines may also be referred to as "failure points."

Failure point hoister 330 may serve as a parser to effectively remove the runtime environment routines and subroutines that, if failure thereof was to occur, may induce a resource failure leading to, at least, interruption or corruption of the CER in code 200. That is, failure point hoister 330 may displace the processing associated with the identified runtime environment routine and subroutine to a point that, in at least one embodiment, precedes the CER of code 200.

Such "eager preparation" of the CER increases the likelihood that execution of a runtime environment routine or subroutine associated with the CER will not suffer a failure leading to interruption or corruption of the CER since any potential failure points associated with the CER are typically pre-executed prior to executing the code within the CER itself. More particularly, by eagerly preparing the CER, potentially corrupting runtime environment routines and subroutines are exposed before imposing any expense on the execution of the identified CER or, perhaps, other portions of code 200.

Alternative embodiments may contemplate displacing the processing associated with the identified runtime environment routine or subroutine to a point that follows the CER of code 200. According to one such example, failure point hoister 330 may disable a runtime environment routine or subroutine (e.g., thread abort), allow the CER of code 200 to execute, and then inject the now-enabled runtime environment routine or subroutine at a point immediately following completion of the CER of code 200. Other examples may contemplate failure point hoister 330 displacing the identified runtime environment routine or subroutine to a point that follows the CER of code 200, either immediately or further along, if processing subsequent to that of the CER is deemed acceptable by either the authoring source of code 200 or the source of data structure 205. Thus, code 200 or data structure 205 identifying the CER may include an annotation that displacement of the runtime environment routine or subroutine to a point after the CER is acceptable.

Even further alternative embodiments may contemplate displacing the processing associated with the identified runtime environment routine or subroutine to a different thread than that in which the CER of code 200 is to be executed. Thus, the "eager preparation" of the CER may occur before, after, or even in parallel with the execution of the CER of code 200.

Further, in alternative embodiments, failure point hoister 330 may further receive from failure point identifier 325 one or more of the embodiments of a reliability contract described and claimed in the above-identified related application "Reliability Contracts" (U.S. Ser. No. 10/845,679 (Martin, et al.); filed May 14, 2004). Accordingly, before any eager preparation of a CER of code 200, a determination may be made of whether code 200 is valid or whether a failure point is likely to impact the execution of properly written code 200.

Accordingly, the example embodiments described herein are capable of providing reliable execution of a designated sub-set of executable code to provide a deterministic execution environment.

Figure 4:
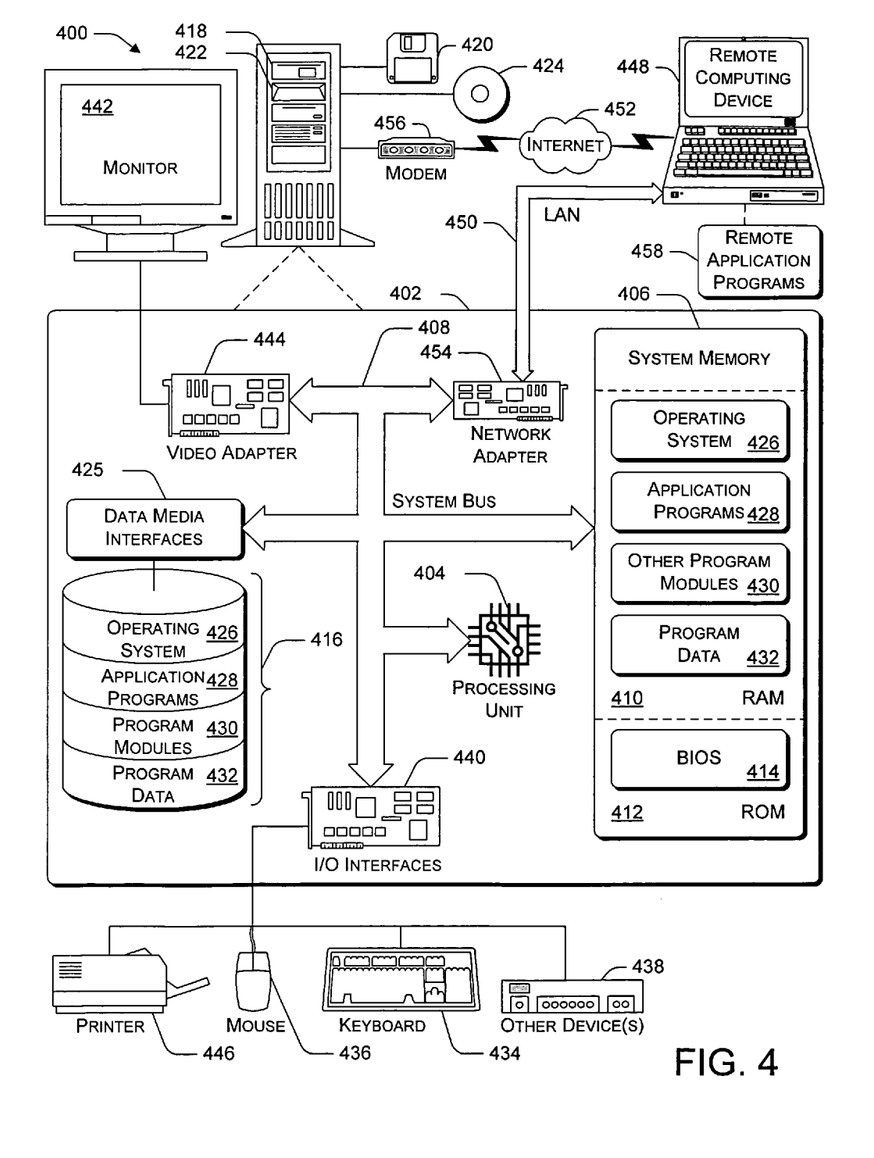
FIG. 4 shows a general computer network environment which can be used to implement the techniques described herein.

FIG. 4 illustrates a general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the example computer environment 400.

Computer environment 400 includes a general-purpose computing device in the form of a computer 402, which may represent any of processing devices 105, 110, 115, and 130 that are described in reference to FIG. 1. The components of computer 402 can include, but are not limited to, one or more processors or processing units 404, system memory 406, and system bus 408 that couples various system components including processor 404 to system memory 406.

System bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 402 may include a variety of computer readable media. Such media can be any available media that is accessible by computer 402 and includes both volatile and non-volatile media, removable and non-removable media.

System memory 406 includes computer readable media in the form of volatile memory, such as random access memory (RAM) 410; and/or non-volatile memory, such as read only memory (ROM) 412 or flash RAM. Basic input/output system (BIOS) 414, containing the basic routines that help to transfer information between elements within computer 402, such as during start-up, is stored in ROM 412 or flash RAM. RAM 410 typically contains data and/or program modules that are immediately accessible to and/or presently operated on by processing unit 404.

Computer 402 may also include other removable/non-removable, volatile/non-volatile computer storage media. By way of example, FIG. 4 illustrates hard disk drive 416 for reading from and writing to a non-removable, non-volatile magnetic media (not shown), magnetic disk drive 418 for reading from and writing to removable, non-volatile magnetic disk 420 (e.g., a "floppy disk"), and optical disk drive 422 for reading from and/or writing to a removable, non-volatile optical disk 424 such as a CD-ROM, DVD-ROM, or other optical media. Hard disk drive 416, magnetic disk drive 418, and optical disk drive 422 are each connected to system bus 408 by one or more data media interfaces 425. Alternatively, hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, removable magnetic disk 420, and removable optical disk 424, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 416, magnetic disk 420, optical disk 424, ROM 412, and/or RAM 410, including by way of example, operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as keyboard 434 and a pointing device 436 (e.g., a "mouse"). Other input devices 438 (not shown specifically) may include a microphone, joystick, game pad, satellite dish, serial port, scanner, and/or the like. These and other input devices are connected to processing unit 404 via input/output interfaces 440 that are coupled to system bus 408, but may be connected by other interface and bus structures, such as a parallel port, game port, or a universal serial bus (USB).

Monitor 442 or other type of display device can also be connected to the system bus 408 via an interface, such as video adapter 444. In addition to monitor 442, other output peripheral devices can include components such as speakers (not shown) and printer 446 which can be connected to computer 402 via I/O interfaces 440.

Computer 402 can operate in a networked environment using logical connections to one or more remote computers, such as remote computing device 448. By way of example, remote computing device 448 can be a PC, portable computer, a server, a router, a network computer, a peer device or other common network node, and the like. Remote computing device 448 is illustrated as a portable computer that can include many or all of the elements and features described herein relative to computer 402. Alternatively, computer 402 can operate in a non-networked environment as well.

Logical connections between computer 402 and remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, computer 402 is connected to local network 450 via network interface or adapter 454. When implemented in a WAN networking environment, computer 402 typically includes modem 456 or other means for establishing communications over wide network 452. Modem 456, which can be internal or external to computer 402, can be connected to system bus 408 via I/O interfaces 440 or other appropriate mechanisms. It is to be appreciated that the illustrated network connections are examples and that other means of establishing at least one communication link between computers 402 and 448 can be employed.

In a networked environment, such as that illustrated with computing environment 400, program modules depicted relative to computer 402, or portions thereof, may be stored in a remote memory storage device. By way of example, remote application programs 458 reside on a memory device of remote computer 448. For purposes of illustration, applications or programs and other executable program components such as the operating system are illustrated herein as discrete blocks, although it is recognized that such programs and components reside at various times in different storage components of computing device 402, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. A method, comprising:
   receiving code to be executed;
   providing a runtime environment comprising a routine injected into at least a portion of the code in order for the code to be executed on an operating system;
   receiving an identification of a sub-set of the code for which no tolerance for a runtime environment induced resource failure during an execution of the identified sub-set of the code; resulting from processing of the injected routine is expected;
   identifying a potential failure point associated with the processing of the injected routine in the code;
   displacing the processing of the injected routine at the identified potential failure point to a location separate from the identified sub-set of the code, wherein displacing the processing of the injected routine at the identified failure point includes repositioning at least a portion of a runtime environment routine that is associated with the identified sub-set of the code for execution before or after execution of the identified sub-set of the code; and
   executing the identified sub-set of the code.

2. A method according to claim 1, wherein the runtime environment induced resource failures includes at least one of: thread abort conditions; out-of-memory conditions; and stack overflow conditions.

3. A method according to claim 1, wherein identifying the potential failure point includes identifying at least a portion of a runtime environment routine that has a potential to induce a resource failure during processing in correspondence with the identified sub-set of the code.

4. A method according to claim 1, wherein the sub-set of the code is a critical region.

5. A method according to claim 1, wherein the identified sub-set of the code is not contiguous.

6. A method according to claim 1, wherein receiving the identification of the sub-set of the code includes receiving an in-band notification.

7. A method according to claim 1, wherein receiving the identification of the identification of the sub-set of the code includes receiving an out-of-band notification.

8. A computer storage medium having one or more instructions that, when read, cause one or more processors to:
   receive code to be executed;
   provide a runtime environment comprising a runtime environment subroutine injected into at least a portion of the code in order for the code to be executed on an operating system;
   receive identification of a sub-set of the code for which no tolerance for a runtime environment induced resource failure resulting from processing of the injected subroutine is expected;
   identify a potential failure point associated with the processing of the injected runtime environment subroutine in the code;
   displace the processing of the injected runtime environment subroutine at the identified failure point to a location separate from the identified sub-set of the code, wherein displacing the processing of the injected subroutine at the identified failure point includes repositioning at least a portion of a runtime environment subroutine that is associated with the identified sub-set of the code for execution before or after execution of the identified sub-set of the code; and execute the identified sub-set of the code.

9. A computer storage medium according to claim 8, wherein the one or more instructions to displace the identified runtime environment subroutine causes the one or more processors to hoist the identified runtime environment subroutine to a point that precedes the identified sub-set of the code.

10. A computer storage medium according to claim 8, wherein the failure includes at least one of: thread abort; out-of-memory; stack overflow; control deadlock resolution; execution termination; or execution interruption.

11. A computer storage medium according to claim 8, wherein the failure includes conditions that are not anticipated.

12. A computer storage medium according to claim 8, wherein the identified runtime environment subroutine is part of a compiling program.

13. A computer storage medium according to claim 8, wherein the one or more instructions to displace the identified runtime environment subroutine causes the one or more processors to hoist the identified runtime environment subroutine to a point that follows the identified sub-set of the code.

14. A computer storage medium according to claim 8, wherein the one or more instructions to displace the identified runtime environment subroutine causes the one or more processors to execute the identified runtime environment subroutine in a different thread than the identified sub-set of the code.

15. A computer storage medium according to claim 8, wherein the identified sub-set of the code of the program is designated by an in-band notification.

16. A computer storage medium according to claim 8, wherein the identified sub-set of the code of the program is designated by an out-of-band notification.

17. A processing device, comprising:
   a processor executing computer executable instructions, comprising: receive code to be executed; a runtime environment comprising a runtime environment sub-routine injected into at least a portion for the code in order for the code to be executed on an operating system; a failure point identifier to identify the runtime environment subroutine having a potential to induce resource failure within an identified sub-set of the code as being a failure point that is identified as having no tolerance for the runtime environment induced resource failure during an execution of the identified sub-set of the code resulting from processing of the injected sub-routine is expected; and a failure point hoister to displace the processing of the injected sub-routine at the identified failure point to a location separate from the identified sub-set of the code, wherein displacing the processing of the injected sub-routine at the identified failure point includes repositioning at least a portion of a runtime environment subroutine that is associated with the identified sub-set of the code for execution before or after execution of the identified sub-set of the code.

18. A processing device according to claim 17, wherein the runtime environment induced resource failure includes any one of: thread abort; out-of-memory; stack overflow; control deadlock resolution; execution termination; or execution interruption.

19. A processing device according to claim 17, wherein the failure point hoister displaces the runtime environment sub-routine to a point that precedes the sub-set of code.

20. A processing device according to claim 17, wherein the failure point hoister displaces the runtime environment sub-routine to a point that follows the sub-set of code.

21. A processing device according to claim 17, wherein the failure point hoister displaces the runtime environment sub-routine to a different thread than a thread to which the sub-set of the code corresponds.

22. A processing device according to claim 17, wherein the failure point identifier is to identify the sub-set of the code upon receiving an in-band notification.

23. A processing device according to claim 17, wherein the failure point identifier is to identify the sub-set of the code upon receiving an out-of-band notification.

24. A processing device, comprising:
means for having a processor for executing computer executable instructions, comprising: means for receiving code to be executed; means for comprising a runtime environment routine injected into at least a portion for the code in order for the code to be executed on an operating system;
means for designating a runtime environment routine having a potential to induce resource failure within an identified sub-set of the code as being a failure point during an execution of the identified sub-set of the code the failure resulting from processing of the injected routine is expected; and
means for eagerly preparing the identified sub-set of the code by hoisting the processing of the injected routine at the failure point at a location separate from the identified sub-set of the code, wherein the mean for eagerly preparing the identified sub-set of the code moves the designated runtime environment routine to a point of execution before or after the identified sub-set of the code is to be executed.

25. A processing device according to claim 24, wherein the failure includes at least one of: thread abort; out-of-memory; stack overflow; control deadlock resolution; execution termination; or execution interruption.

26. A processing device according to claim 24, wherein the processing device receives an identification of the sub-set of the code from a programming entity of a program to which the sub-set of the code corresponds.

27. A processing device according to claim 24, wherein the means for eagerly preparing the identified sub-set of the code moves the designated runtime environment routine to a point of execution after the identified sub-set of the code is to be executed.

28. A processing device according to claim 24, wherein the means for eagerly preparing the identified sub-set of the code moves the designated runtime environment routine to a thread that is different from the thread in which the identified sub-set of the code is to be executed.

29. A processing device according to claim 24, wherein the designated runtime environment subroutine is part of a compiling program.

* * * * *